United States Patent
Shao

(10) Patent No.: US 11,669,715 B2
(45) Date of Patent: Jun. 6, 2023

(54) HARDWARE ARCHITECTURE FOR ACCELERATING ARTIFICIAL INTELLIGENT PROCESSOR

(71) Applicant: Nanjing Iluvatar CoreX Technology Co., Ltd., Nanjing (CN)

(72) Inventor: Pingping Shao, San Jose, CA (US)

(73) Assignee: Shanghai Iluvatar CoreX Semiconductor Co., Ltd., Shanghai (CN)

( * ) Notice: Subject to any disclaimer, the term of this patent is extended or adjusted under 35 U.S.C. 154(b) by 1030 days.

(21) Appl. No.: 16/237,610

(22) Filed: Apr. 30, 2019

(65) Prior Publication Data
US 2020/0042867 A1    Feb. 6, 2020

(30) Foreign Application Priority Data

Aug. 1, 2018  (CN) .......................... 201810862182.1

(51) Int. Cl.
*G06N 3/04*       (2023.01)
*G06F 9/50*       (2006.01)
*G06F 13/00*      (2006.01)
*G06N 3/063*      (2023.01)
*G06T 1/20*       (2006.01)
*G06F 13/12*      (2006.01)

(52) U.S. Cl.
CPC ............. *G06N 3/04* (2013.01); *G06F 9/5027* (2013.01); *G06F 13/00* (2013.01); *G06N 3/063* (2013.01); *G06T 1/20* (2013.01)

(58) Field of Classification Search
CPC ..... G06F 16/285; G06Q 40/02; G06V 30/197
See application file for complete search history.

(56) References Cited

U.S. PATENT DOCUMENTS

| | | | |
|---|---|---|---|
| 2006/0020608 A1* | 1/2006 | D'Hers | G06Q 40/02 |
| 2012/0276342 A1* | 11/2012 | Bray | E02D 5/80 |
| | | | 264/151 |
| 2014/0114974 A1* | 4/2014 | Ohama | G06F 16/285 |
| | | | 707/737 |
| 2017/0316312 A1 | 11/2017 | Goyal | |
| 2017/0344880 A1 | 11/2017 | Nekuii | |
| 2019/0172238 A1* | 6/2019 | Miao | G06V 30/194 |
| 2019/0340499 A1* | 11/2019 | Burger | G06N 3/063 |

FOREIGN PATENT DOCUMENTS

CN        108304341 A       7/2018

* cited by examiner

Primary Examiner — Getente A Yimer
(74) Attorney, Agent, or Firm — Loeb & Loeb LLP

(57) ABSTRACT

A hardware architecture that may include: a host, a frontal engine, a parietal engine, a renderer engine, an occipital engine, a temporal engine, and a memory. The frontal engine may obtain a 5D tensor from the host and divide it into several groups of tensors. These groups of tensors may be sent or transmitted to the parietal engine, and the parietal engine may take the groups of tensors to further divide them into several tensors. The parietal engine may send these tensors to the renderer engine for execution and may send a partial amount of tensors to the occipital engine. The occipital engine may accumulate the partial amount of tensors and may execute them. The occipital engine may send the output feature as the final tensor to the temporal engine. The temporal engine may compress the final tensor before storing or saving it to the memory.

8 Claims, 5 Drawing Sheets

HARDWARE ARCHITECTURE FOR ACCELERATING ARTIFICIAL INTELLIGENT PROCESSOR

CROSS-REFERENCE TO RELATED APPLICATION

This US nonprovisional patent application claims priority to a Chinese invention application serial number 201810862182.1, filed on Aug. 1, 2018, whose disclosure is incorporated by reference in its entirety herein.

TECHNICAL FIELD

Embodiments of the invention generally relate to the field of artificial intelligence, and particularly relate to a hardware architecture for accelerating an artificial intelligence processor.

BACKGROUND

Artificial intelligence (AI) processing has been a popular topic recently, both in terms of computationally and memory intensive, as well as high performance-power efficiency. Accelerating computing with current devices such as CPUs and GPUs is not easy, and many solutions such as GPU+TensorCore, tensor processing unit (TPU), central processing unit (CPU)+field programmable gate array (FPGA), and AI application-specific integrated circuit (ASIC) has been proposed to address these problems. GPU+TensorCore tends to focus on solving computationally intensive problems, while TPU tends to focus on computation and data reuse issues, and CPU+FPGA/AI ASICs focus on improving performance-power efficiency.

However, only one-third of the GPU's logic is used for AI, so higher performance is not available. The TPU needs more software work to reshape the data layout, split the jobs, and send them to the compute core. As for CPU and DSP solutions, their computer core is a vector processor and is not suitable for AI pipeline engineering.

Therefore, aspects of the invention attempt to address the following hardware architecture to solve these problems, and although there are many other AI ASICs, proposed AI ASIC has a better architecture.

SUMMARY

Embodiments of the invention address the deficiencies in the prior art and provides a hardware architecture for accelerating an artificial intelligence processor.

In one embodiment, in order to achieve the above, aspects of the invention incorporate the following technical solutions:

A hardware architecture accelerates an artificial intelligence processor where the artificial intelligence work is regarded as a 5D tensor. In each dimension, work is divided into groups, and each group may be further divided into a plurality of waves. The hardware architecture may include: a host, a frontal engine, a parietal engine, a renderer engine, an occipital engine, a temporal engine, and a random access memory (RAM). In one example, the frontal engine may obtain a 5D tensor from the host and divide it into several groups of tensors. These groups of tensors may be sent or transmitted to the parietal engine, and the parietal engine may take the groups of tensors to further divide them into several tensors. In one embodiment, the parietal engine may send these tensors to the renderer engine for execution as an input feature renderer and may send a partial amount of tensors as an output to the occipital engine. In one embodiment, the occipital engine may accumulate the partial amount of tensors and may execute them as an output feature to the renderer engine. In one aspect, the occipital engine may send the output feature as the final tensor to the temporal engine. The temporal engine may compress the final tensor before storing or saving it to the internal memory.

In order to optimize the above technical solutions, the specific measures may be taken. For example, they include:

Each parietal engine may possess the group tensors according to a user-defined input feature renderer and may output the partial sum to the occipital engine.

In one embodiment, in a unified rendering architecture, in one embodiment, executing the output feature renderer may include: the output feature renderer is sent back to the parietal engine, and once the parietal engine finishes rendering, the result is sent back to the occipital engine.

In another embodiment, in a split rendering architecture, executing the output feature renderer may include: the output feature renderer is processed in the occipital engine, the occipital engine sends the output tensor to the frontal engine. The frontal engine performs post-processing and send it to DRAM or keep it in the cache for further processing.

In another embodiment, numbers of parietal engines are configurable, and the frontal engine may send the group tensors to the parietal engine in a polling schedule. For example, each parietal engine may include a specific stream perceptron processor. In one aspect, the stream perceptron processor shares an L2 cache and an export block.

The stream perceptron processor may include an operator core and a neuron core as a computational core. The operator core may be used for general calculation, and the neuron core may be used for artificial intelligence calculation. In one example, the neuron core may include an L1 buffer and a multiply accumulator.

In one example, the tensor wave may be sent to the neuron, and the neuron may run the input feature renderer on the tensor wave. The result may be exported to the occipital engine. The occipital engine may perform the necessary accumulation and may send the result back to the parietal engine. The parietal engine is operating. The output feature renderer is output on the device and the result is output to the blade engine.

The number of parietal engines may be four, for example. Each parietal engine may include two flow perceptron processors, with each flow perceptron processor having four neurons, and each neuron having eight multiply accumulator group. Each multiply accumulator group may include 4 multiply accumulators.

The beneficial effects of the aspects of the invention include: artificial intelligence work is divided into a number of highly parallel parts, some parts are allocated to an engine for processing, with the number of engines is configurable. Such configuration may improve scalability and that all working partitions and distribution may be implemented in this architecture for high performance. Embodiments of the invention may accelerate the work of artificial intelligence, and may use the scalability to configure products to meet different customer's needs while providing high performance effects.

DETAIL DESCRIPTION OF DRAWINGS

In order to more clearly describe the technical schemes in the specific embodiments of the present application or in the prior art, hereinafter, the accompanying drawings required to be used in the description of the specific embodiments or the prior art will be briefly introduced. Apparently, the drawings described below show some of the embodiments of present application, and for those skilled in the art, without expenditure of creative labor, other drawings may be derived on the basis of these accompanying drawings.

DETAILED DESCRIPTION

Embodiments of the present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Aspects of the invention may now be described in further detail with reference to the drawings.

Figure 1:
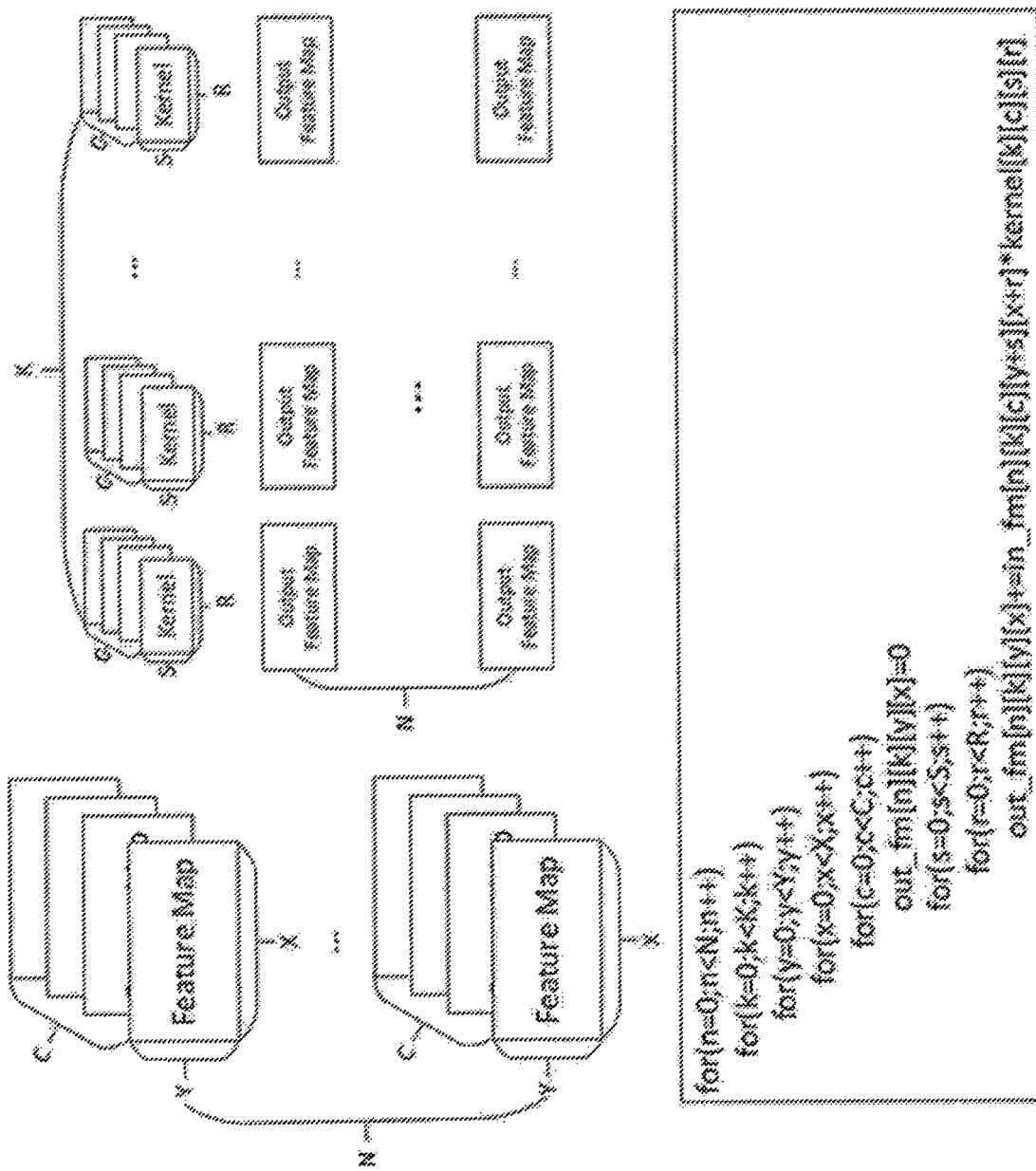
FIG. 1 is an artificial intelligence feature map according to one embodiment of the invention.

As shown in FIG. 1, the artificial intelligence feature map may generally be described as a four-dimensional tensor [N, C, Y, X]. The four dimensions are: feature graph dimensions: X, Y; channel dimension: C; batch dimension: N. In one example, the kernel may be a four-dimensional tensor [K, C, S, R]. The AI task may provide the input feature tensor and kernel tensor. Based on the formula in FIG. 1, an output tensor [N, K, Y, X] may be calculated.

Figure 2:
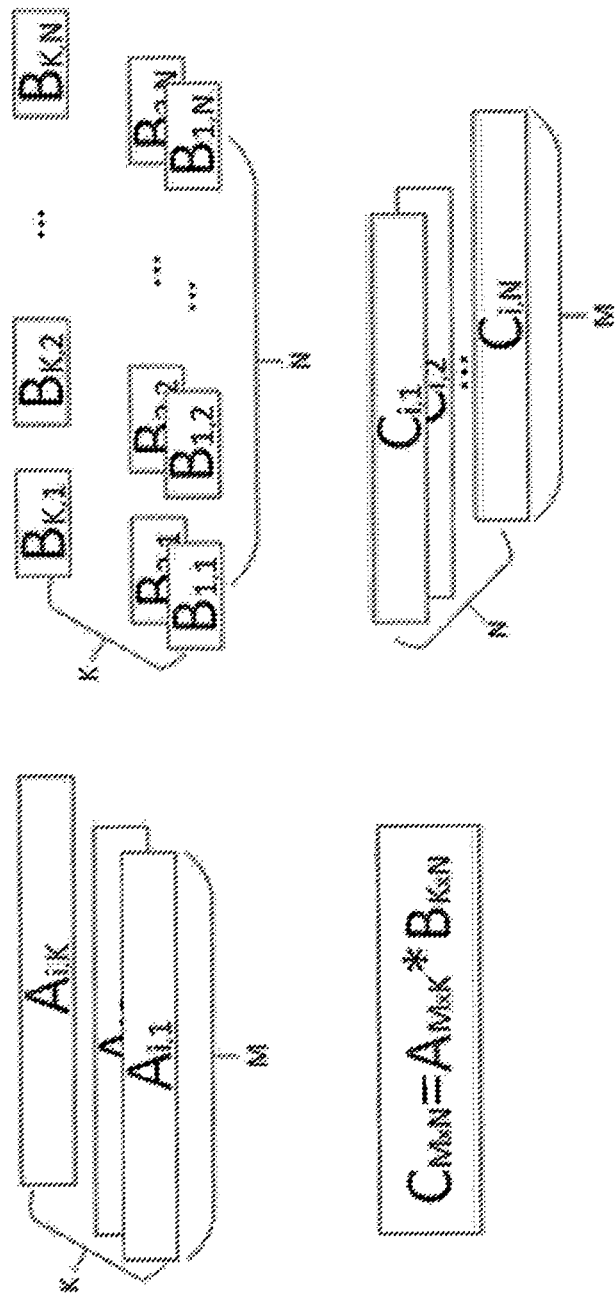
FIG. 2 is a matrix multiplication diagram according to one embodiment of the invention.

In another example, an important operation in artificial intelligence is the matrix multiplication, which may also be mapped into feature map processing. For example, in FIG. 2, matrix A may be mapped to tensors [1, K, 1, M], matrix B may be mapped to tensors [N, K, 1, 1], and the result C is tensor [1, N, 1, M].

In addition, there are other operations, such as normalization, activation, which may be supported in a general purpose hardware operator.

Figure 3:
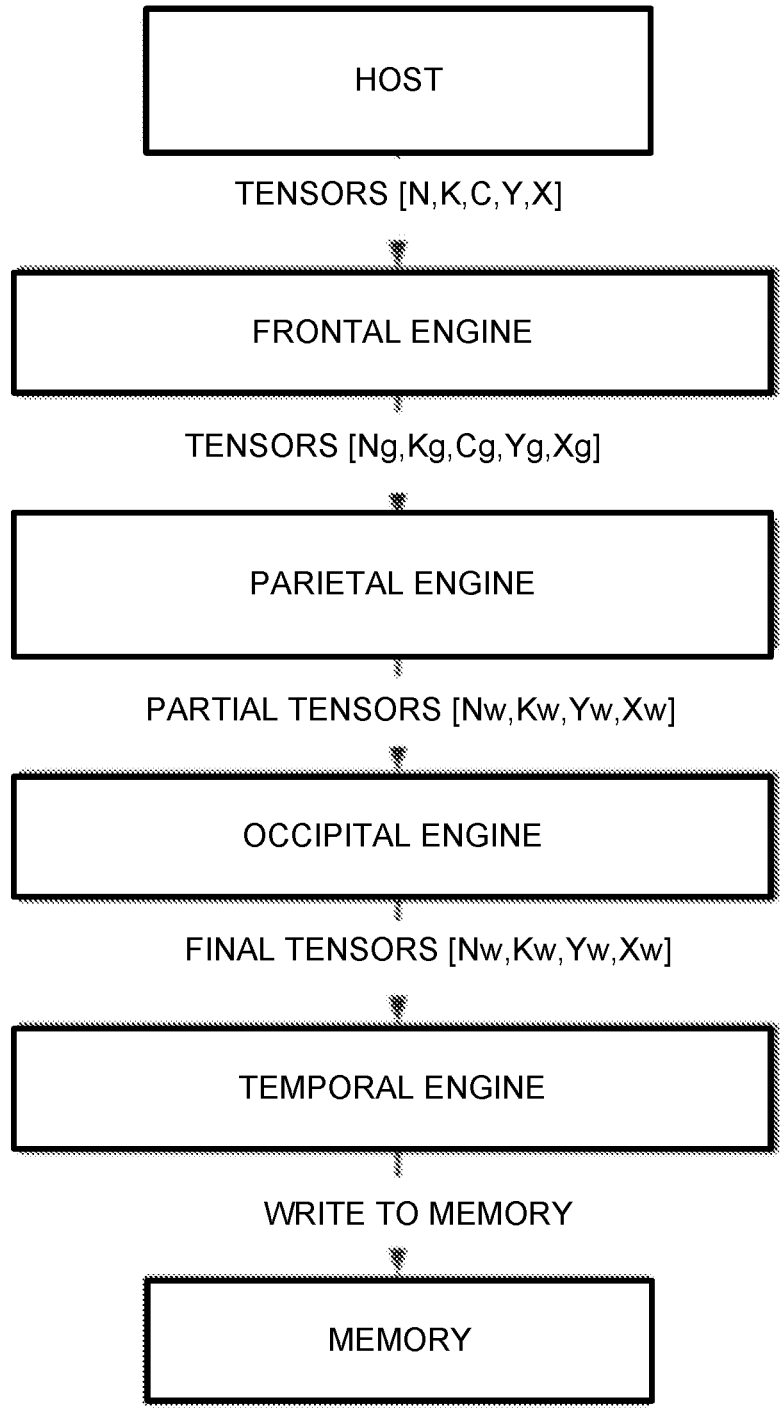
FIG. 3 is an Artificial brain engine flow chart according to one embodiment of the invention.

Aspects of the invention propose a hardware architecture to effectively support these operations. In one aspect, the artificial intelligence work may be considered as 5-dimensional tensors [N, K, C, Y, X]. In each dimension, tasks may be divided into many groups. Each group may be further divided into several waves. In one embodiment, an architecture, a first engine, the frontal engine (FE) receives 5D tensors [N, K, C, Y, X] from the host The frontal engine may divide them into many sets of tensors, such as [ Ng, Kg, Cg, Yg, Xg], and send these groups to the parietal engine (PE). The PE may obtain the group tensor and divides them into waves. The waves may be sent to the renderer engine to be executed as the input feature renderer (IF-Shader), and may output partial tensors [Nw, Kw, Yw, Xw] to the occipital engine (OE). The OE may accumulate a partial tensor and may execute an output feature renderer (OF-Shader) to obtain the final tensor sent to the next engine, the temporal engine (TE). TE may perform some data compression and write the final tensor into memory. In one example, FIG. 3 illustrates a flow chart of the design according to one embodiment of the invention.

According to the AI algorithm, aspects of the invention provide a highly scalable, parallelizable, programmable and efficient architecture. In this architecture, AI tasks may be divided into small parts that are sent to many computer cores for processing. Partial sums may be accumulated in the computational core and then sent to the backend block for further processing, such as final accumulation, pooling, and activation; these backend blocks may also be programmed to run other general purpose calculations.

Figure 4:
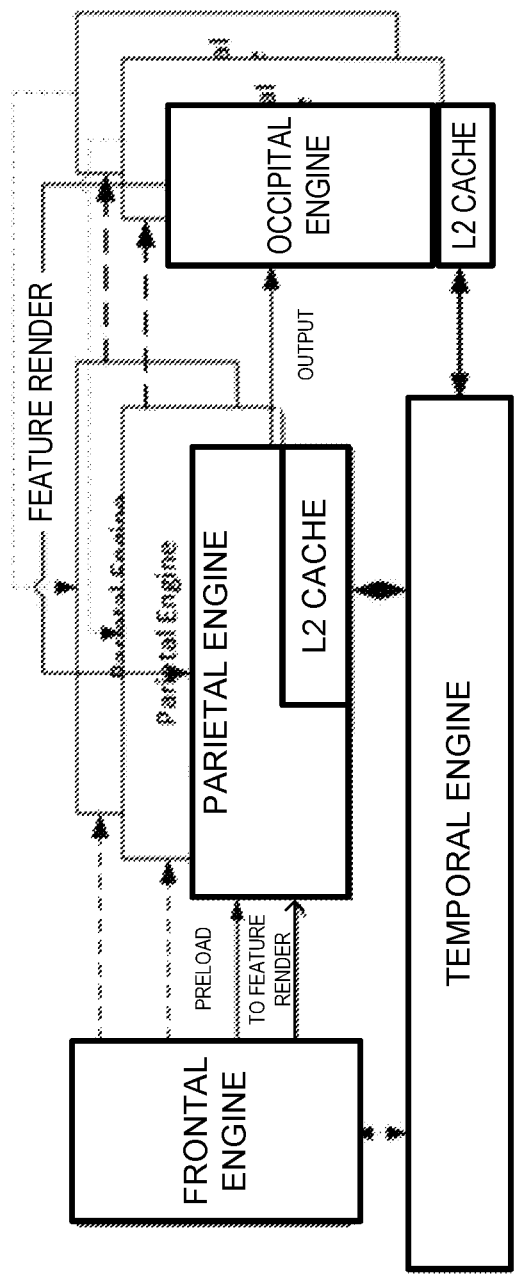
FIG. 4 is an engine level architecture diagram according to one embodiment of the invention.

In one embodiment, FIG. 4 is an engine level flow diagram of the architecture, which we may refer to it as an "artificial brain architecture" that is fully scalable for a variety of computing power requirements. In general, in the frontal engine (FE), the tensors may be divided into groups, which are sent to the parietal engine (PE). Each parietal engine processes these groups according to a user-defined input feature renderer (IF-Shader) and outputs the partial sum to the occipital engine (OE). The OE collects output tensors and schedules output feature rendering to further process the tensor.

In one embodiment, there may be two ways to execute the output feature renderer (OF-Shader): in a unified rendering architecture, the output feature renderer is sent back to the parietal engine, and once the parietal engine finishes rendering, it sends the result back to OE. In another embodiment, in a split rendering architecture, the output feature renderer is processed in the OE. The result of the OE may be sent to the output tensor to the temporal engine (TE). The TE performs some post processing, and sends them to the DRAM or they are kept in the cache for further processing.

Figure 5:
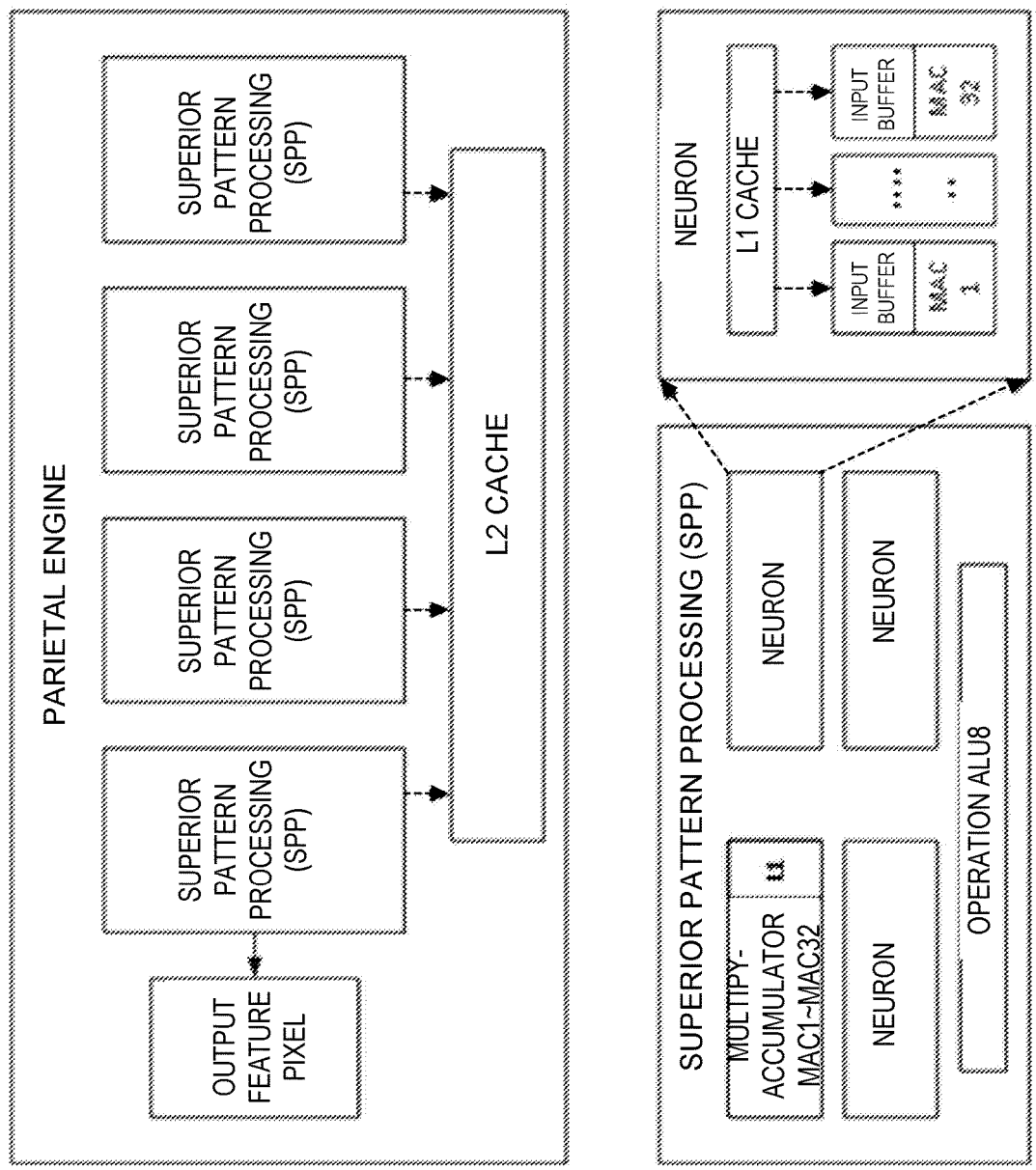
FIG. 5 is a diagram illustrating details of the scalable architecture according to one embodiment of the invention.

For scalability, the number of parietal engines may be configurable. In another example, the frontal engine may send the group tensors to the parietal engine according to a polling schedule, so that it is easy to add/reduce the number of paraxial engine. Each parietal engine may include a SPP (Streaming Perceptron Processor), as shown in FIG. 5. All of these SPPs share an L2 cache and a derived block. The SPP may include some general operators and some neurons that are the core of the calculation. The general operator core may be used for general calculations, and the neuron kernel may be used for artificial intelligence calculations. For different market segments of general computing, the ratio of these two cores may be configured as the key to the architecture.

For example, neurons may include an L1 cache and some multiplier-accumulators (MACs). Tensor waves are sent to the neurons, which may run an input feature renderer on these tensor waves, and the results are exported to the occipital engine. In one example, the occipital engine may perform some necessary accumulation and may send the results back to the parietal engine. The parietal engine may run the output feature renderer on the operator ALU8 and outputs the result to the temporal engine.

In the embodiment, 4 parietal engines may be used, each parietal engine includes 2 SPPs. Each SPP in turn may include 4 neurons with each neuron having 8 MAC groups. In one example, each MAC group may include 4 MACs. The architecture proposed by embodiments of the invention enable AI to work very efficiently.

It should be noted that the terms "upper", "lower", "left", "right", "front", "rear" and the like cited in the invention are also merely for convenience of description. It is not intended to limit the scope of the invention, and the change or adjustment of the relative relationship is also considered to be within the scope of the invention.

The above is only a preferred embodiment of the present invention, and the scope of protection of the present invention is not limited to the above embodiments, and all the technical solutions under the inventive concept belong to the protection scope of the present invention. It should be noted that a number of improvements and modifications of the present invention without departing from the principles of the invention are considered to be within the scope of the invention.

Apparently, the aforementioned embodiments are merely examples illustrated for clearly describing the present application, rather than limiting the implementation ways thereof. For a person skilled in the art, various changes and modifications in other different forms may be made on the basis of the aforementioned description. It is unnecessary and impossible to exhaustively list all the implementation ways herein. However, any obvious changes or modifications derived from the aforementioned description are intended to be embraced within the protection scope of the present application.

The example embodiments may also provide at least one technical solution to a technical challenge. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

While the disclosure has been described in terms of exemplary embodiments, those skilled in the art will recognize that the disclosure may be practiced with modifications that fall within the spirit and scope of the appended claims. These examples given above are merely illustrative and are not meant to be an exhaustive list of all possible designs, embodiments, applications, or modification of the disclosure.

In summary, the integrated circuit with a plurality of transistors, each of which may have a gate dielectric with properties independent of the gate dielectric for adjacent transistors provides for the ability to fabricate more complex circuits on a semiconductor substrate. The methods of fabricating such an integrated circuit structures further enhance the flexibility of integrated circuit design. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A hardware architecture for accelerating an artificial intelligence processor, comprising:
   artificial intelligence task is regarded as a 5D tensor in an application-specific integrated circuit (ASIC), and in each dimension, the task is divided into groups, and each group being further divided into a plurality of waves;
   a host,
   a frontal engine,
   a parietal engine,
   a renderer engine,
   an occipital engine,
   a temporal engine, and
   a memory, wherein the memory comprises random access memory (RAM);
   wherein the frontal engine obtains a 5D tensor from the host and divides the 5D tensor into a plurality of tensors, wherein the parietal engine sends the plurality of tensors to the renderer engine, wherein the renderer engine is configured to execute an input feature renderer and a partial tensor output to the occipital engine, wherein the occipital engine accumulates a partial tensor and executes an output feature renderer to obtain a final tensor sent to the temporal engine, wherein the temporal engine performs data compression and writes the final tensor into the memory.

2. The hardware architecture according to claim 1, wherein the parietal engine processes the plurality of tensors according to a user-defined input feature renderer and outputs the partial tensor output to the occipital engine.

3. The hardware architecture according to claim 1, wherein in a unified rendering architecture, the execution of the output feature renderer is sent back to the parietal engine, and in response to the parietal engine finishes rendering, the result is sent back to the occipital engine.

4. The hardware architecture according to claim 1, wherein n is the split rendering architecture, wherein the output feature renderer is specifically, wherein the output feature renderer is processed in the occipital engine, the occipital engine sends the output tensor to the temporal engine, the temporal engine performs post processing, and sends it to DRAM or keep it in the cache for further processing.

5. The hardware architecture according to claim 1, wherein the number of parietal engines is configurable, wherein the frontal engine sends the group tensors to the parietal engine in a polling schedule, and each parietal engine consists of a specific stream-aware processor, all stream-aware processor shares an L2 cache and an export block.

6. The hardware architecture according to claim 5, wherein The stream perceptron processor comprises an operator core and a neuron kernel as a computational core, wherein the operator core is configured for a general computation, wherein the neuron kernel is configured for an artificial intelligence computation, and the neuron kernel is composed of an L1 buffer and a multiply accumulator.

7. The hardware architecture according to claim 6, wherein the tensor wave is sent to the neuron kernel, wherein the neuron kernel runs the input feature renderer on the tensor wave, wherein an output from the neuron kernel is exported to the occipital engine, wherein the occipital engine performs accumulation and sends the output back to the parietal engine, wherein the parietal engine is executed on a calculator output feature renderer and output the result to the temporal engine.

8. The hardware architecture according to claim 6, wherein the number of parietal engines is four, wherein each parietal engine has two stream perceptron processors, wherein each stream perceptron processor has four neurons, and wherein each neuron has eight multiply accumulator sets, wherein each of the eight multiply accumulator sets has 4 multiply accumulators.

* * * * *